United States Patent
Ardanese et al.

(10) Patent No.: US 8,794,057 B2
(45) Date of Patent: Aug. 5, 2014

(54) DIAGNOSTIC OPERATION STRATEGY FOR DIESEL OXIDATION CATALYST AGING LEVEL DETERMINATION USING $NO_x$ SENSOR $NO_2$ INTERFERENCE

(71) Applicant: GM Global Technology Operations LLC, Detroit, MI (US)

(72) Inventors: Raffaello Ardanese, Troy, MI (US); Vincent J. Tylutki, Livonia, MI (US); James M Perrin, Livonia, MI (US); Justin A Shetney, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/688,342

(22) Filed: Nov. 29, 2012

(65) Prior Publication Data

US 2014/0144220 A1 May 29, 2014

(51) Int. Cl.
G01M 15/10 (2006.01)
F01N 11/00 (2006.01)

(52) U.S. Cl.
CPC ............... *F01N 11/007* (2013.01); *Y02T 10/24* (2013.01); *F01N 2560/026* (2013.01)
USPC ..................................... 73/114.75

(58) Field of Classification Search
CPC ..... Y02T 10/24; F01N 2550/02; F01N 13/02; F01N 11/00; F01N 3/2066; F01N 3/106; F01N 2560/14; F01N 11/007; F01N 2560/026
USPC ..................................... 73/114.75
See application file for complete search history.

(56) References Cited

U.S. PATENT DOCUMENTS

| | | | |
|---|---|---|---|
| 7,610,750 B2* | 11/2009 | Viola et al. | 60/286 |
| 8,161,808 B2* | 4/2012 | Crawford et al. | 73/114.75 |
| 8,408,055 B2* | 4/2013 | Van Nieuwstadt et al. | 73/114.73 |
| 2008/0022658 A1* | 1/2008 | Viola et al. | 60/286 |
| 2008/0178656 A1* | 7/2008 | Nieuwstadt et al. | 73/23.31 |
| 2010/0154386 A1* | 6/2010 | Perrin et al. | 60/277 |
| 2010/0175368 A1* | 7/2010 | Schulze | 60/273 |
| 2010/0319316 A1* | 12/2010 | Kasahara | 60/273 |
| 2011/0023456 A1* | 2/2011 | Levijoki et al. | 60/274 |
| 2012/0260625 A1* | 10/2012 | Feldmann et al. | 60/273 |

* cited by examiner

*Primary Examiner* — Freddie Kirkland, III
(74) *Attorney, Agent, or Firm* — Quinn Law Group, PLLC

(57) ABSTRACT

A method of determining aging of a diesel oxidation catalyst (DOC) in an engine exhaust system includes receiving a first sensor signal from a first nitrogen oxides (NOx) sensor positioned in exhaust flow upstream of the DOC. The first sensor signal is indicative of an amount of NOx in the exhaust flow upstream of the DOC. The method further includes receiving a second sensor signal from a second NOx sensor positioned in the exhaust flow downstream of the DOC. The second sensor signal is indicative of an amount of NOx downstream of the DOC. A difference between the first sensor signal and the second sensor signal is calculated by a controller. A DOC aging level based on a predetermined correlation between the difference and DOC aging can then be determined by the controller if at least one predetermined operating condition is satisfied.

17 Claims, 3 Drawing Sheets

US 8,794,057 B2

DIAGNOSTIC OPERATION STRATEGY FOR DIESEL OXIDATION CATALYST AGING LEVEL DETERMINATION USING $NO_x$ SENSOR $NO_2$ INTERFERENCE

TECHNICAL FIELD

The present teachings generally include an exhaust system and a method for determining the aging level of a diesel oxidation catalyst in the exhaust system.

BACKGROUND

Vehicle exhaust systems often include exhaust after-treatment devices that filter or otherwise treat the exhaust prior to releasing the exhaust into the environment. A diesel oxidation catalyst (DOC) is a device that utilizes a chemical process in order to break down pollutants from a diesel engine in the exhaust flow, turning them into less harmful components. DOCs are often honeycomb-shaped configurations coated in a precious metal catalyst designed to trigger a chemical reaction to reduce gaseous emissions. DOCs oxidize carbon monoxide, hydrocarbons, nitric oxide (NO), and diesel particulate matter. Additionally, DOCs may reduce nitrogen oxides (NOx) to a certain extent, although the majority of NOx reduction is achieved by a selective catalytic reduction (SCR) system that is typically placed downstream of the DOC in the exhaust flow. The SCR converts NOx into nitrogen and water.

SUMMARY

A method of determining aging of a diesel oxidation catalyst (DOC) in an engine exhaust system includes receiving a first sensor signal from a first nitrogen oxides (NOx) sensor positioned in exhaust flow upstream of the DOC. The first sensor signal is indicative of an amount of NOx in the exhaust flow upstream of the DOC. The method further includes receiving a second sensor signal from a second NOx sensor positioned in the exhaust flow downstream of the DOC. The second sensor signal is indicative of an amount of NOx downstream of the DOC. A controller receives the sensor signals. A difference between the first sensor signal and the second sensor signal is calculated by the controller. A DOC aging level based on a predetermined correlation between the difference and DOC aging can then be determined by the controller. Because the predetermined correlation is most accurate under certain operating conditions, the method ensures that the DOC aging level is determined only if at least one predetermined operating condition is satisfied.

The method thus includes determining whether at least one predetermined operating condition is satisfied. Any of several predetermined operating conditions can be considered under the method. In one embodiment, the predetermined operating condition can be that regeneration of a diesel particulate filter has occurred within a predetermined time period. Another predetermined operating condition can be that the exhaust flow temperature is less than a predetermined temperature.

In one embodiment, another predetermined operating condition required to be satisfied under the method is that an exhaust fluid injector positioned upstream in exhaust flow of an SCR system is inactive. If determined to be inactive, the method can also control the diesel exhaust fluid injector to remain inactive until a predetermined amount of NOx has flowed past the first NOx sensor. When diesel exhaust fluid is not being injected, the second NOx sensor signal will more accurately reflect the influence of the DOC on the conversion of NOx in the exhaust flow.

The method may include determining an exhaust flow rate at the first NOx sensor. A predetermined operating condition can be that the flow rate is within a predetermined range of flow rates. Such a requirement enables a more accurate determination of DOC aging level by avoiding determinations when the flow rate is too high or too low to provide an accurate reading.

The method may also include determining a mass flow rate of NOx flowing past the first NOx sensor based at least partially on the first sensor signal. Using the mass flow rate that was determined, an amount of time can be determined over which a predetermined amount of NOx passes the first NOx sensor. During this amount of time, as monitored by a timer in the controller, additional sensor signals are received from the first and second NOx sensors. Calculating the difference between the first and the second sensor signals can include averaging differences between the first and the second sensor signals and the additional sensor signals periodically received during the amount of time. By basing the calculated difference on the averaged differences rather than on a single set of sensor signal readings, the DOC aging level that is determined is more accurate and less prone to be influenced by a temporary or artificially high or low NOx value at either of the NOx sensors.

An amount of nitrogen dioxide ($NO_2$) in the exhaust flow to an SCR system downstream of the DOC can also be estimated from the DOC aging level that was determined from the sensor signals.

Accordingly, by requiring one or more predetermined operating conditions to be satisfied before making a DOC aging level determination based on the NOx sensor signals, the DOC aging level determination will be more accurate and reliable.

The above features and advantages and other features and advantages of the present teachings are readily apparent from the following detailed description of the best modes for carrying out the present teachings when taken in connection with the accompanying drawings.

DETAILED DESCRIPTION

Figure 1:
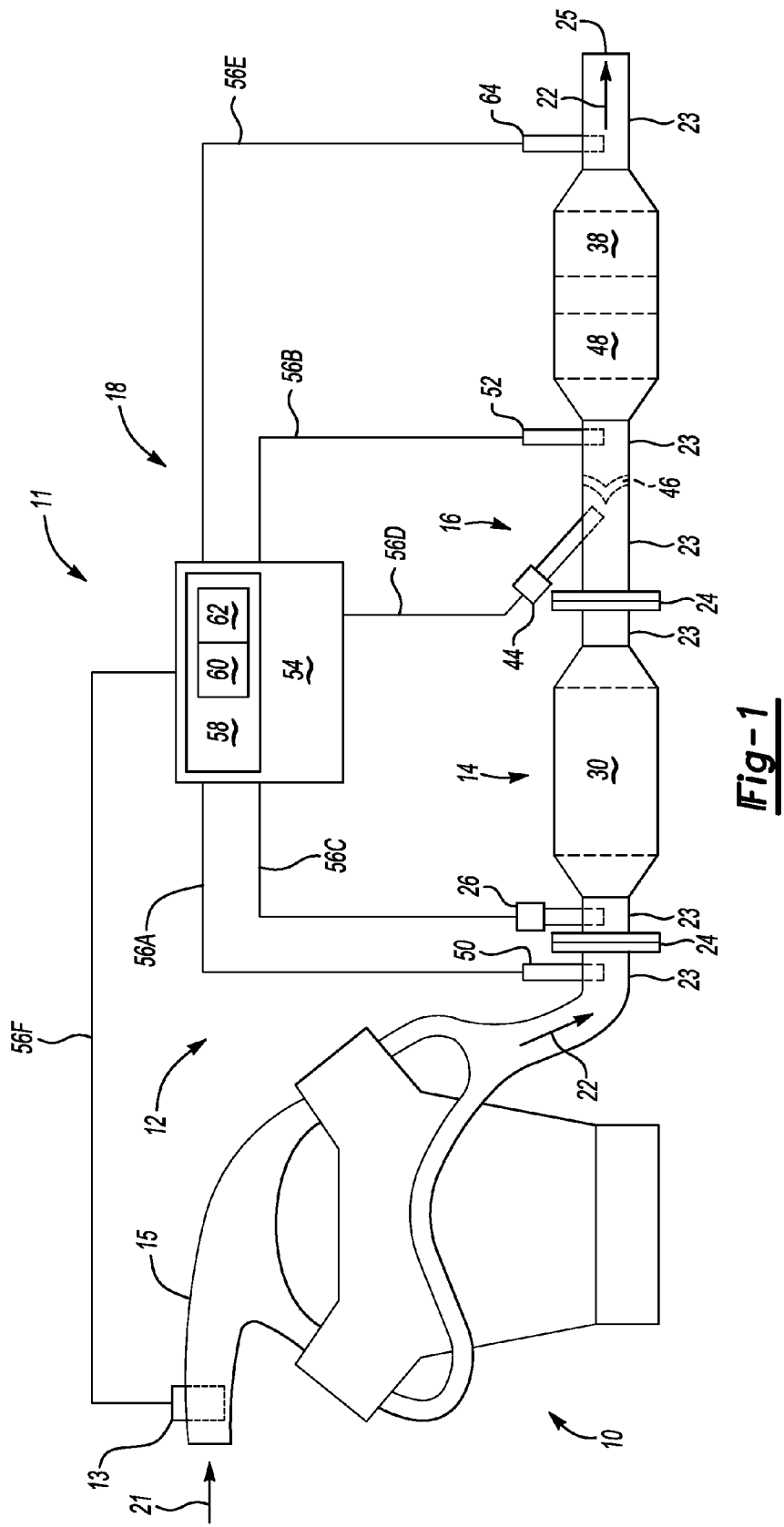
FIG. 1 is a schematic illustration in side view of a portion of a vehicle having an engine and an engine exhaust system.

Referring to the drawings, wherein like reference numbers refer to like components throughout the several views, FIG. 1 shows an engine 10 that is part of a vehicle 11 with an exhaust system 12 that includes a diesel oxidation catalyst (DOC) 14. A selective catalyst reduction (SCR) system 16 is downstream of the DOC 14 in the exhaust flow. The exhaust system 12 treats an exhaust flow, generally indicated by arrows 22, which is exhausted through an exhaust pipe 23 from the engine 10. The exhaust pipe 23 includes several sections connected by flanges 24. The exhaust flows in the direction of the arrows 22 from the engine 10 to an outlet 25 of the exhaust system 12. Air flows into the engine 10 in the direction of arrow 21, through an air intake manifold 15. A mass air flow (MAF) sensor 13 measures the intake air mass flow rate. The MAF sensor 13 is operatively connected to the controller 54 by a transfer conductor 56F so that the controller 54 can receive sensor signals from the MAF sensor 13.

The exhaust system 12 includes a monitoring system 18 that is operable to determine, among other things, the aging level of the DOC 14. The aging level of the DOC 14 can be used to estimate an amount of nitrogen dioxide ($NO_2$) flowing to the SCR 16. The aging level of a DOC 14 is a measure of the efficiency of the DOC 14 in oxidizing carbon monoxide, hydrocarbons, and diesel particulate matter. A new DOC will have an aging level of zero and has the greatest oxidizing efficiency. After some number of miles traveled by the vehicle 11, the DOC 14 will have an aging level of 100 percent aged, at which the DOC 14 is unable to oxidize carbon monoxide, hydrocarbons, nitric oxide (NO), or diesel particulate matter.

The DOC 14 is a flow-through device that includes a canister containing a substrate 30 or honeycomb-like structure. The substrate 30 has a large surface area that is coated with an active catalyst layer. The DOC 14 treats the exhaust flow to reduce the toxicity of the exhaust gas, i.e., to reduce toxic emissions of the exhaust gas, including but not limited to, nitric oxide (NO), carbon monoxide (CO), and/or hydrocarbons (HC). The DOC 14 has an active catalyst material that may include platinum group metals, and converts a percentage of the nitrogen oxides (NOx) in the exhaust gas into nitrogen ($N_2$) and carbon dioxide ($CO_2$) or water ($H_2O$), as well as oxidizes a percentage of the carbon monoxide (CO) to carbon dioxide ($CO_2$) and oxidizes a percentage of the unburnt hydrocarbons (HC) to carbon dioxide ($CO_2$) and water ($H_2O$), and oxidizes nitric oxide into nitrogen dioxide ($NO_2$).

The active catalyst layer of the DOC 14 must be heated to a light-off temperature of the catalyst before the active catalyst layer becomes operational and oxidizes the nitrogen oxides, the carbon monoxide and the unburnt hydrocarbons. In order to rapidly heat the DOC 14 and/or other components of the engine exhaust system 12, a hydrocarbon injector 26 injects hydrocarbons into the exhaust gas flow. The hydrocarbons are ignited to generate heat within the exhaust gas, which is transferred to the DOC 14 and/or the other components of the exhaust system 12.

The exhaust system 12 also includes a particulate filter 38 disposed downstream of the DOC 14. The particulate filter 38 filters particulate matter, i.e., soot, from the exhaust flow. The particulate filter 38 may include one or more substrates. The particulate matter collects on the substrates as the exhaust flows through the particulate filter 38. The particulate filter 38 is occasionally regenerated to remove the collected particulate matter. Regeneration of the particulate filter 38 includes heating the particulate filter 38 to a temperature sufficient to burn the collected particulate matter to carbon dioxide. Regeneration is associated with extremely high exhaust temperatures. The predetermined correlation between the NOx difference percentage and DOC aging may not be sufficiently accurate at such high exhaust temperatures. Additionally, one regenerative technique involves injecting a catalyst into the exhaust flow, which may have an effect on the NOx difference percentage that is unrelated to the DOC aging level. Thus, during regeneration, the predetermined correlation may not be accurate. However, if regeneration has occurred within a predetermined, preceding time period, then the exhaust temperature should be within a range at which the correlation is accurate, and another regeneration will not occur during an amount of time in which the NOx sensor signals are used to determine the difference.

The SCR system 16 includes an exhaust fluid injector 44, which injects an exhaust fluid, such as but not limited to a mixture of urea and water, into the exhaust flow. A mixer 46 mixes the injected exhaust fluid with the exhaust flow. When heated by the exhaust gas in the exhaust flow, the exhaust fluid forms ammonia. The SCR system 16 further includes a converter 48. The converter 48 includes a catalyst that causes or accelerates a chemical reaction between the ammonia created by the exhaust fluid and NOx in the exhaust gas to form nitrogen ($N_2$) and water vapor ($H_2O$).

The monitoring system 18 includes a first NOx sensor 50 positioned in communication with the exhaust upstream in the exhaust flow of the DOC 14. The first NOx sensor 50 is operable to generate a first sensor signal indicative of an amount of NOx in the exhaust flow upstream of the DOC 14. The monitoring system 18 also includes a second NOx sensor 52 positioned in communication with the exhaust downstream in the exhaust flow of the DOC 14. The second NOx sensor 52 is operable to generate a second sensor signal indicative of an amount of NOx downstream of the DOC 14. A controller 54 is operatively connected to both of the first and second NOx sensors 50, 52 by transfer conductors, such as wires 56A, 56B. The first sensor signal can be an electronic signal generated by the first NOx sensor 50 and carried along the transfer conductor 56A to the controller 54. The second sensor signal can be an electronic signal generated by the second NOx sensor 52 and carried along the transfer conductor 56B. The hydrocarbon injector 26 and the exhaust fluid injector 44 are also operatively connected to the electronic controller 54 by transfer conductors 56C, 56D to provide sensor signals to the controller 54 and receive control signals from the controller 54 when operating conditions indicate injection of hydrocarbons or exhaust fluid is warranted.

Commercially available NOx sensors measure an amount of various NOx compounds in the exhaust flow. One component of NOx is nitrogen dioxide ($NO_2$). Nitrogen dioxide is a relatively large molecule that interferes with other NOx compounds entering the NOx sensor. Therefore, an increase in $NO_2$ in the exhaust flow will cause a decrease in a NOx reading by a NOx sensor, all other factors being equal. This phenomenon can be referred to as NOx sensor $NO_2$ interference.

When exhaust gas flows through the DOC 14, the DOC 14 converts nitric oxide (NO) in the exhaust flow to nitrogen dioxide ($NO_2$). When the DOC 14 is new, its ability to convert nitric oxide to nitrogen dioxide is at a maximum. As the DOC 14 ages, i.e., as the vehicle 11 is driven more miles, the catalyst in the DOC 14 is increasingly depleted, and the ability of the DOC 14 to convert nitric oxide to nitrogen dioxide decreases. The phenomenon of NOx sensor $NO_2$ interference experienced at the second NOx sensor 52 downstream of the DOC 14 should therefore be most prevalent when the DOC 14 is most active in converting nitric oxide to nitrogen dioxide. That is, NOx interference at the second NOx sensor 52 decreases as the DOC 14 ages. All other factors being equal, the NOx reading at the second NOx sensor 52 should therefore increase as the DOC 14 ages. The first NOx sensor 50 is upstream of the DOC 14 in the exhaust flow, and is therefore not affected by aging of the DOC 14. Accordingly, a difference between a value of the first sensor signal and a value of the second sensor signal can be used to determine an aging level of the DOC 14.

The controller 54 is configured with a processor 58 that carries out a stored algorithm 60. The stored algorithm 60 calculates a difference between the first sensor signal received from the first NOx sensor 50 and the second sensor signal received from the second NOx sensor 52. The algorithm 60 then determines a DOC aging level based on a predetermined correlation between the calculated difference and DOC aging. The predetermined correlation can be stored in a look-up table or database 62 accessed by the algorithm 60 and can be established as discussed herein. When the algorithm 60 has determined the DOC aging level, the controller 54 can be configured to provide this information to a diagnostic tool or display. For example, if the DOC aging level determined by the algorithm 60 is higher than a preselected aging level, so that the operating efficiency of the DOC 14 is less than a desirable operating efficiency, a diagnostic signal can be generated by the controller 18 to be read by a diagnostic tool or provided to a dash panel display or the like, to indicate to a vehicle operator that the DOC 14 should be replaced.

Optionally, the monitoring system 18 can also include a temperature sensor 64 positioned in the exhaust gas flow and operatively connected to the controller 18 by a transfer conductor, such as wire 56E. In the embodiment shown, the temperature sensor 64 is downstream of the SCR system 16, but the sensor 64 could be located anywhere in communication with the exhaust flow. The temperature sensor 64 is operable to generate a third sensor signal indicative of a temperature of the exhaust gas flow. The temperature sensor 64 can be any suitable sensor configured to withstand the temperature ranges experienced within the exhaust system 12. For example, the temperature sensors can be configured to generate an electrical signal proportionate to temperature.

Figure 2:
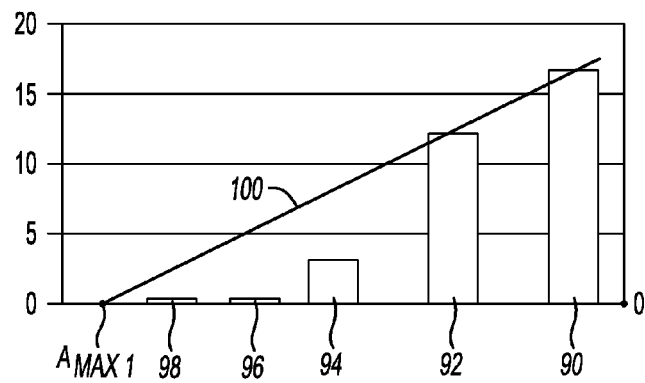
FIG. 2 is a plot of a percentage difference in NOx sensor readings versus aging level of a DOC of the engine exhaust system of FIG. 1 at a first exhaust temperature.
Figure 3:
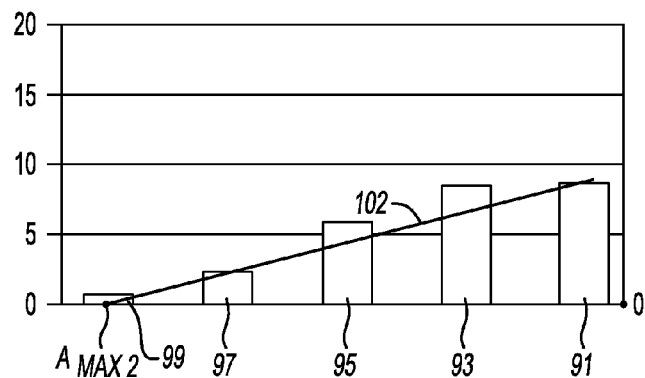
FIG. 3 is a plot of a percentage difference in NOx sensor readings versus aging level of the DOC of the engine exhaust system of FIG. 1 at a second exhaust temperature higher than the first exhaust temperature.

FIGS. 2 and 3 illustrate the effect on exhaust gas temperature on the relationship between a percentage difference between the readings of the NOx sensors 50 and 52 and aging level of the DOC 14. Specifically, FIG. 2 shows aging of the DOC 14 increasing from right to left along the horizontal axis, beginning at an aging level of zero (0) corresponding with a new DOC 14, to a maximum aging level, $A_{MAX1}$, corresponding with complete depletion of the catalyst in the DOC 14.

The vertical axis of FIG. 2 indicates a "NOx difference" percentage, which is the ratio of the difference between the value of the first NOx sensor signal received from the first NOx sensor 50 and the value of the second NOx sensor signal received from the second NOx sensor 52 to the value of the first NOx sensor signal. As the DOC 14 ages (from right to left in FIG. 2), the DOC 14 converts less NOx to $NO_2$. Accordingly, the ratio difference percentage decreases with aging of the DOC 14, as the DOC 14 cannot convert any NOx when depleted. Bars 90-98 on the plot of FIG. 2 represent test data establishing different aging levels of DOCs substantially identical to DOC 14. Bar 90 represents a NOx sensor difference percentage measurement of a DOC aged by operation on a vehicle driven 2000 miles. Bar 92 represents a NOx sensor difference percentage measurement of a DOC aged by operation on a vehicle driven 4000 miles. Bar 94 represents a NOx sensor difference percentage measurement of a DOC aged by operation on a vehicle driven 120,000 miles. Bar 96 represents a NOx sensor difference percentage measurement of a DOC aged by operation on a vehicle for 24 hours with exhaust flow at 1100 degrees Celsius. Bar 98 represents a NOx sensor difference percentage of a DOC with a platinum catalyst completely depleted. In all instances, DOCs used for the test data were substantially identical to the DOC 14 and were tested on an exhaust system substantially identical to exhaust system 12.

FIG. 2 illustrates that a linear relationship exists between NOx difference percentage and DOC aging. A line 100 is the best fit line to the data bars 90-98, and represents NOx difference percentage as a function of DOC aging level. The best fit line 100 indicates that a theoretical maximum aging level is at $A_{MAX1}$, slightly beyond the actual maximum aging level at the completely depleted test data at bar 98. The relationship indicated by the best fit line 100 can be stored in the database 62 of the controller 54, and the controller 54 can calculate a NOx difference percentage (the difference in the first sensor signal and the second sensor signal divided by the first sensor signal), and correlate a DOC aging level with the calculated NOx difference percentage.

The aging level of the DOC 14 illustrated in FIG. 2 occurs when temperature of the exhaust flow is at 200 degrees Celsius. FIG. 3 illustrates the relationship between the NOx difference percentage and DOC aging level at a higher exhaust flow temperature of 350 degrees Celsius, showing a best fit line 102 representing NOx difference percentage as a function of DOC aging level. Bars 91, 93, 95, 97 and 99 represent test data for DOCs aged under the same conditions and parameters as described with respect to bars 90, 92, 94, 96 and 98 of FIG. 2, except at the higher exhaust flow temperature. The relationship remains linear, but FIG. 3 illustrates that there is a temperature window for DOC NO to $NO_2$ conversion in which NO to $NO_2$ conversion efficiency is a function of temperature. Aging level increases from right to left in FIG. 3, from an aging level of zero (0), corresponding with zero miles on the vehicle, to an aging level of $A_{MAX2}$, corresponding with the theoretical maximum aging level as determined by the best fit line 102. The algorithm 60 can be configured so that the predetermined correlation between the NOx difference percentage and DOC aging level is further based on the temperature of the exhaust flow, as indicated by the third sensor signal. That is, the DOC aging level can be determined based on the NOx difference percentage multiplied by a factor that accounts for the exhaust gas temperature effect on DOC NO to $NO_2$ conversion efficiency, with the factor being temperature-dependent.

An amount of $NO_2$ entering the SCR system 16 can be estimated by the algorithm 60 based on the DOC aging level that is determined by the algorithm 60. As the DOC aging level increases, less NOx is converted to $NO_2$ by the DOC 14, so the amount of $NO_2$ entering the SCR system 16 is less dependent on the DOC 14 and largely dependent only on other factors, such as the combustion efficiency of the engine 10. The aging level of the DOC 14, as determined by the controller 54 based on the sensor signals, can be used to estimate the amount of $NO_2$ entering the SCR system 16.

Figure 4:
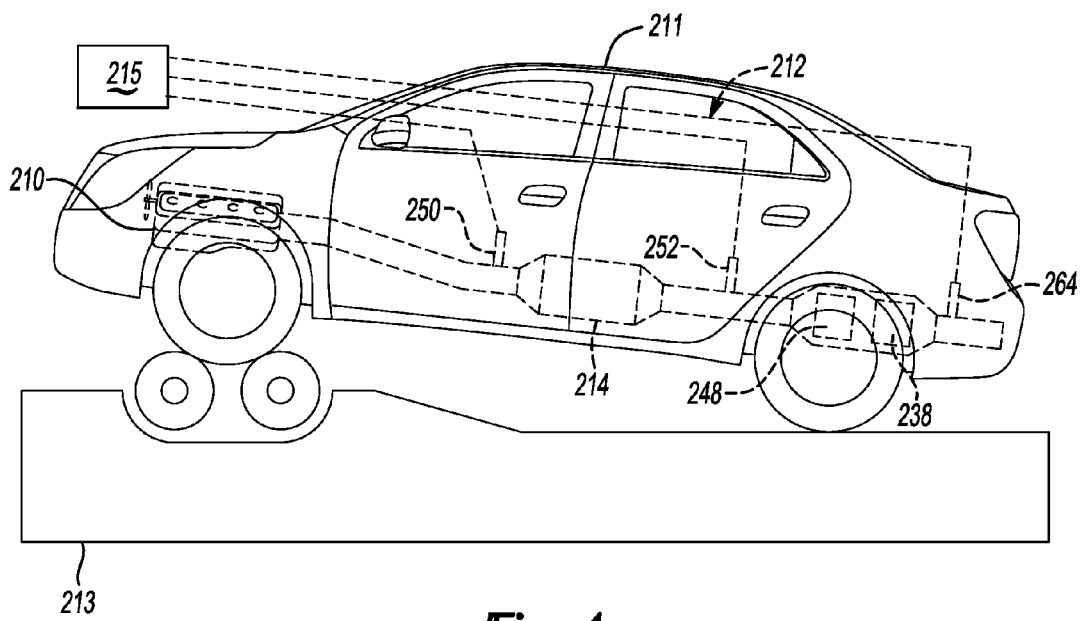
FIG. 4 is a schematic illustration of a vehicle on a dynamometer, with the vehicle having an engine exhaust system substantially identical to the engine exhaust system of FIG. 1.

The relationship between the NOx difference percentage, temperature of the exhaust flow, and DOC aging level can be determined by testing of DOCs such as described with respect to FIGS. 2 and 3, using a substantially identical exhaust system and storing the relationships determined by the test data in a data base 62, also referred to as a look-up table, that is accessed by the algorithm 60. Specifically, referring to FIG. 4, the data base 62 can be established by repeatedly running a vehicle 211 on a dynamometer 213 over a predetermined duty cycle to cause DOC aging. The vehicle 211 includes an engine 210 and an engine exhaust system 212 substantially identical to the engine 10 and exhaust system 12. That is, the exhaust system 212 has a DOC 214 substantially identical to DOC 14, a first NOx sensor 250 substantially identical to first NOx sensor 50 upstream of the DOC 214, and a second NOx sensor 252 substantially identical to second NOx sensor 52 downstream of the DOC 214. The substantially identical first NOx sensor 250 is operable to provide sensor signals indicative of an amount of NOx in the exhaust flow upstream of the DOC 214. The second NOx sensor 252 is operable to provide sensor signals indicative of an amount of NOx downstream of the DOC 214.

Testing of the exhaust system 212 includes running the vehicle 211 on the dynamometer 213 and monitoring a number of revolutions of the dynamometer 213. The mileage of the vehicle 211 can be related to the number of revolutions of the dynamometer 213.

The NOx sensors 250, 252 provide sensor signals to a testing computer 215 used to record the data. The computer 215 has a processor with an algorithm that calculates the differences in the NOx sensor signal provided by the first and second NOx sensors 250, 252 during the testing. These sensor signal differences can be stored in the computer 215, and later stored in the data base 62 on the controller 54.

The exhaust system 212 can also have a temperature sensor 264, substantially identical to the temperature sensor 64, that provides a sensor signal to the computer 215 indicative of the temperature of the exhaust flow. The sensor signal differences obtained from the sensors 250, 252 can be further correlated in the stored data base 62 of the controller 54 with temperature signals provided by the temperature sensor 264.

With the data base 62 prepared as described, the processor 58 of the controller 54 can thus carry out the algorithm 60, also referred to herein as a method of determining aging of a DOC in an engine exhaust system. The method 60 limits a DOC aging level determination to vehicle operating conditions that will ensure that the predetermined correlation between the NOx difference percentage and the DOC aging level is accurate.

Figure 5:
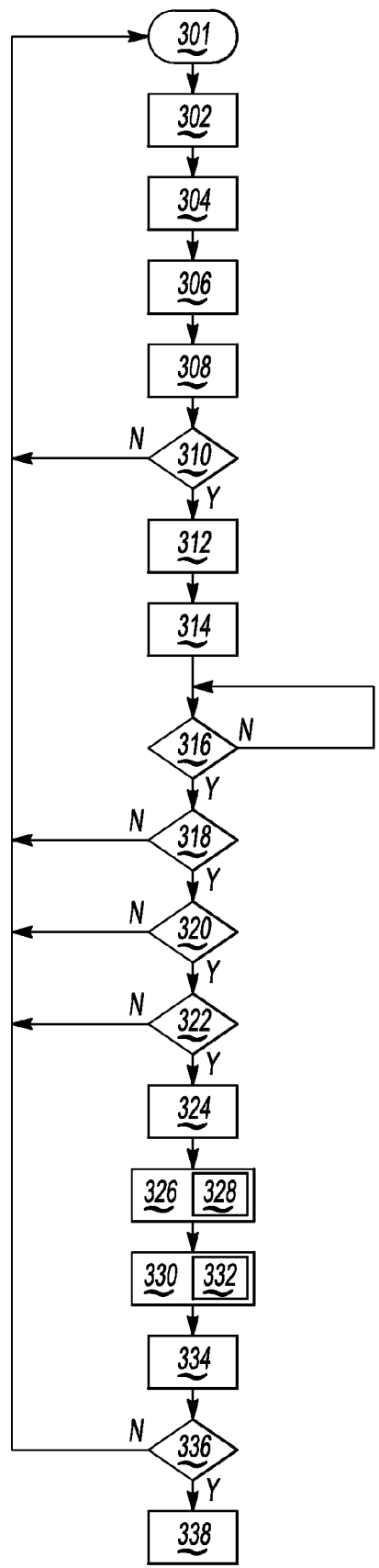
FIG. 5 is a flow diagram of a method of determining aging of a DOC.

The method 60 is illustrated as a flow diagram in FIG. 5, and starts at 301. In step 302, the processor 58 receives the first sensor signal from the first NOx sensor 50 upstream in the exhaust flow of the DOC 14. In step 304, the processor 58 receives the second sensor signal from the second NOx sensor 52 downstream of the exhaust flow of the DOC 14. In step 306, the processor 58 receives the third sensor signal from the temperature sensor 64. Each of steps 302, 304, and 306 can be repeated periodically so that NOx sensor signal data and temperature sensor signal data is continuously available to the processor 58.

The method 60 can then perform a number of steps that enable a determination of whether vehicle operating conditions satisfy predetermined requirements for making a DOC aging level determination based on the NOx sensor signals. Although steps 302 to 324 are shown in one order for purposes of illustration in the flow chart of FIG. 5, they could be performed in any order under the method 60. Moreover, some of the steps, such as steps 308, 312 and 318, could be performed simultaneously by the controller 54 in determining whether predetermined operating conditions are satisfied.

In step 308, the method 60 can determine an exhaust flow rate of exhaust flowing past the first NOx sensor 50. The exhaust flow rate can be determined using a sensor signal from the MAF sensor 13 that is indicative of a flow rate of inlet air. The processor 58 can also receive information regarding the amount of fuel injected into the engine 10 at the time of the MAF sensor signal reading. An exhaust flow rate can be determined based on the inlet air flow rate and the amount of fuel injected, as is understood by a person skilled in the art.

In step 310, the method can determine whether the exhaust flow rate of step 308 is within a predetermined range of exhaust flow rates. The predetermined range of flow rates are those for which it has been determined that the NOx sensors 50, 52 will provide a NOx difference percentage that is sufficiently indicative of DOC aging level. For example a minimum exhaust flow rate of the range of flow rates is that below which the first NOx sensor 50 will provide an inaccurately low reading. At very low exhaust flow rates, the engine 10 is running at a very low load and corresponding fueling rate. Accordingly, the engine-out hydrocarbon in parts per million (PPM) is relatively high. The first NOx sensor 50 is located directly downstream of the engine 10 in the exhaust flow, not downstream of any exhaust after-treatment hardware such as the DOC 14 or the diesel particulate filter 38. At exhaust temperatures of less than approximately 200 degrees Celsius and with relatively high HC levels, the signal of the first NOx sensor 50 reads incorrectly low, such as 15-20 percent lower than when the engine 10 and engine exhaust system 12 are tested on a bench or dynamometer as described with respect to FIG. 4. The incorrectly low reading under these operating conditions may even cause the value of the signal of the first NOx sensor 50 to be lower than the value of the signal of the second NOx sensor 52, when it is expected that the signal of first NOx sensor 50 is greater than the signal of the second NOx sensor 52.

A maximum exhaust flow rate of the predetermined range of exhaust flow rates is that above which there is insufficient time for NOx to enter the NOx sensors 50, 52. Additionally, the $NO_2$ produced by the DOC 14 decreases as a function of exhaust flow rate. As exhaust flow rate increases, the difference between the signals of the $NO_x$ sensors 50, 52 therefore decreases, and does not reflect the linear relationship shown in FIGS. 2 and 3. In one example embodiment, the range of exhaust flow rates can be from a minimum flow rate of 300 kilograms per hour to a maximum exhaust flow rate of 750 kilograms per hour. If it is determined in step 310 that the exhaust flow rate is not within the predetermined range of exhaust flow rates, then the method 60 returns to the start 301.

If it is determined in step 310 that the exhaust flow rate is within the predetermined range of exhaust flow rates, the method 60 proceeds to step 312 in which the mass flow rate of NOx is determined. The mass flow rate of NOx can be determined using the exhaust flow rate of step 308 and with information from the controller 54 regarding the amount of fuel injected by fuel injectors in the engine 10 over a period of time. In step 314, the controller 54 can then determine the amount of time necessary for a predetermined amount of NOx to pass the first NOx sensor 50 with the mass flow rate as determined in step 312. In one example embodiment, the predetermined amount of NOx can be from 1 gram to 9 grams. A timer included in the processor 58 can then count until it is determined in step 316 that the amount of time has passed, and therefore the predetermined amount of NOx has flowed past the first NOx sensor 50. During this amount of time, the controller 54 continues to receive periodic sensor signals from the first and second NOx sensors 50, 52 and the temperature sensor 64. As discussed with respect to steps 326 and 328, these signals can be used to determine an average of the NOx difference percentages, and the DOC aging level can be based on the averaged difference. Using the additional NOx sensor signal data received during this amount of time will presumably provide a more accurate DOC aging level determination than a determination based on only one set of sensor signals.

In step 318, the controller 54 determines whether regeneration of the DOC 14 has occurred within a predetermined time period. For optimal conditions to determine the DOC aging level, the predetermined time period should be sufficiently prior to the current time so that exhaust temperature has decreased below a predetermined temperature, as determined in step 320, but not so remote that another regeneration may be imminent. In one example embodiment, the predetermined time period can be five minutes. The predetermined time period therefore can be defined as being between a first time and a later second time, both measured from the present time. If regeneration has not occurred within the predetermined time period, then the method 60 returns to start the 301.

If regeneration has occurred within the predetermined time period, then the controller 54 determines in step 320 whether the exhaust temperature is below the predetermined temperature. This determination can be made using the sensor signals received from the temperature sensor 64. Although the temperature sensor 64 is shown located downstream of the SCR system 16, the temperature sensor 64 may be anywhere downstream of the DOC 14 for purposes of the method 60. If the temperature of the exhaust flow is not less than the predetermined temperature, then the method 60 returns to the start 301. In one example embodiment, the predetermined temperature can be 200 degrees Celsius.

If the temperature of the exhaust flow is less than the predetermined temperature in step 320, then the controller 54 determines in step 322 whether the diesel exhaust fluid injector 44 is inactive. If the exhaust fluid injector 44 is inactive, then in step 324, the controller 54 controls the exhaust fluid injector 44 to remain inactive until the amount of time determined in step 314 has passed. If the exhaust fluid injector 44 is active, however, the method 60 returns to the start 301. The exhaust fluid injector 44 should be inactive in order to obtain a reliable NOx difference percentage because injection of exhaust fluid by the exhaust fluid injector 44 would introduce NOx into the exhaust system 12 midway between the sensors 50, 52, and any NOx difference percentage between the sensors 50, 52 would then not be determined solely by the aging level of the DOC 30.

After step 324, if all of the predetermined operating conditions of steps 308 to 324 satisfied, the controller 54 calculates the difference between values of the first and second NOx sensor signals in step 326. As discussed in step 314, this calculation may be based on an average of the differences in the NOx sensor signals determined in step 328. Based on this calculated difference of step 326, the controller 54 can then determine a DOC aging level in step 330. Step 330 may include a sub step 332 in which a stored data base or stored look-up table 62 is accessed. The stored look-up table 62 has calculated differences in the first and second NOx sensor signals obtained from testing correlated with DOC aging levels, as determined in the testing described with respect to FIG. 4. The DOC aging levels stored in the look-up table 62 may be further categorized by temperature to account for the effect of exhaust temperature on DOC aging, as described with respect to FIGS. 2 and 3. The third sensor signal received in step 306 may be used to further determine the DOC aging level in step 330. The controller 54 can estimate the amount of $NO_2$ flowing to the SCR system 18 in step 334 based on the DOC aging level determined in step 328. Steps 302 to 334 can be repeated periodically to monitor the DOC aging level.

In step 336, the controller 54 can determined whether DOC aging level determined in step 330 is greater than a predetermined aging level. If the DOC aging level is not greater than a predetermined aging level, the method 60 returns to the start 301. If the DOC aging level is greater than a predetermined aging level, then the method 60 may include step 338, in which the controller 54 indicates that DOC aging exceeds a predetermined aging level, such as the aging level that corresponds with the NOx difference percentage of five percent in FIG. 2. This can be indicated in many ways, including providing a dashboard signal or a diagnostic code that indicates the DOC aging level is beyond that determined to be acceptable.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of determining aging of a diesel oxidation catalyst (DOC) in an engine exhaust system comprising:
receiving a first sensor signal from a first nitrogen oxides (NOx) sensor positioned in exhaust flow upstream of the DOC; wherein the first sensor signal is indicative of an amount of NOx in the exhaust flow upstream of the DOC;
receiving a second sensor signal from a second NOx sensor positioned in the exhaust flow downstream of the DOC; wherein the second sensor signal is indicative of an amount of NOx in the exhaust flow downstream of the DOC;
calculating via a controller a difference between the first sensor signal and the second sensor signal;
determining via the controller whether at least one predetermined operating condition is satisfied;
determining via the controller a DOC aging level based on a predetermined correlation between the calculated difference and DOC aging only if the predetermined operating condition is satisfied;
determining a mass flow rate of NOx flowing past the first NOx sensor based at least partially on the first sensor signal;
determining an amount of time over which a predetermined amount of NOx passes the first NOx sensor at the mass flow rate;
periodically receiving additional sensor signals from the first and the second NOx sensors during the amount of time; and
wherein said calculating the difference includes averaging differences between the first and the second sensor signals and the additional sensor signals periodically received during the amount of time.

2. The method of claim 1, wherein the engine exhaust system includes a diesel particulate filter positioned in the exhaust flow; and
wherein said at least one predetermined operating condition is that regeneration of the diesel particulate filter has occurred within a predetermined time period.

3. The method of claim 1, further comprising:
receiving a third sensor signal from a temperature sensor positioned in the exhaust flow; wherein the third sensor signal is indicative of a temperature of the exhaust flow; and
wherein said at least one predetermined operating condition is that the temperature of the exhaust flow is less than a predetermined temperature.

4. The method of claim 3, wherein said predetermined correlation is further based on the temperature of the exhaust flow.

5. The method of claim 1, wherein the engine exhaust system includes an exhaust fluid injector positioned upstream in the exhaust flow of a selective catalyst reduction (SCR) system; and
wherein said at least one predetermined operating condition is that the exhaust fluid injector is inactive.

6. The method of claim 5, further comprising:
controlling the exhaust fluid injector to remain inactive until a predetermined amount of NOx has flowed past the first NOx sensor.

7. The method of claim 1, further comprising:
determining an exhaust flow rate of the exhaust flow flowing past the first NOx sensor; and
wherein said at least one predetermined operating condition is that the exhaust flow rate is within a predetermined range of flow rates.

8. The method of claim 1, wherein the exhaust system includes a selective catalyst reduction (SCR) system in fluid communication with the exhaust flow downstream of the DOC in the exhaust flow, the method further comprising:
estimating an amount of nitrogen dioxide ($NO_2$) in the exhaust flow entering the SCR system based on the determined DOC aging level.

9. An exhaust system for an engine comprising:
a diesel oxidation catalyst (DOC) through which engine exhaust flows;
a selective catalyst reduction (SCR) system in fluid communication with the exhaust flow downstream of the DOC;
a first nitrogen oxides (NOx) sensor positioned in exhaust flow upstream of the DOC; wherein the first NOx sensor is operable to generate a first sensor signal indicative of an amount of NOx in the exhaust flow upstream of the DOC;
a second NOx sensor positioned in the exhaust flow downstream of the DOC; wherein the second NOx sensor is operable to generate a second sensor signal indicative of an amount of NOx in the exhaust flow downstream of the DOC;
a controller operatively connected to the first and the second NOx sensors and operable to execute a stored algorithm that:
calculates a difference between the first sensor signal and the second sensor signal;
determines whether at least one predetermined operating condition is satisfied;
determines a DOC aging level based on a predetermined correlation between the difference and DOC aging only if said at least one predetermined operating condition is satisfied; and
estimates an amount of nitrogen dioxide ($NO_2$) in the exhaust flow entering the SCR system based on the determined DOC aging level.

10. The exhaust system of claim 9, further comprising:
a diesel particulate filter positioned in the exhaust flow; wherein said at least one predetermined operating condition is that regeneration of the diesel particulate filter has occurred within a predetermined time period.

11. The exhaust system of claim 9, further comprising:
a temperature sensor positioned in the exhaust flow and operatively connected to the controller; wherein the temperature sensor is operable to generate a third sensor signal indicative of a temperature of the exhaust flow; and
wherein said at least one predetermined operating condition is that the temperature of the exhaust flow is less than the predetermined temperature.

12. The exhaust system of claim 9, further comprising:
an exhaust fluid injector positioned upstream in the exhaust flow of the selective catalyst reduction (SCR) system and operatively connected to the controller;
wherein said at least one predetermined operating condition is that the exhaust fluid injector is inactive.

13. The exhaust system of claim 12, wherein the controller controls the exhaust fluid injector to remain inactive for a predetermined period of time if the exhaust fluid injector is determined to be inactive.

14. The exhaust system of claim 9, wherein the algorithm further:
determines a mass flow rate of NOx flowing past the first NOx sensor based at least partially on the first sensor signal;
determines an amount of time over which a predetermined amount of NOx passes the first NOx sensor at the mass flow rate;
periodically receives additional sensor signals from the first and the second NOx sensors during the amount of time; and
wherein said calculating the difference includes averaging differences between the first and the second sensor signals and the additional sensor signals periodically received during the amount of time.

15. The exhaust system of claim 9, further comprising:
a mass air flow (MAF) sensor operative to measure the air flow rate into the engine;
wherein the algorithm further:
determines an exhaust flow rate based at least partially on the air flow rate measured by the MAF sensor; and
wherein said at least one predetermined operating condition is that the exhaust flow rate is within a predetermined range of exhaust flow rates.

16. A method of determining aging of a diesel oxidation catalyst (DOC) in an engine exhaust system comprising:
receiving a first sensor signal from a first nitrogen oxides (NOx) sensor positioned in exhaust flow upstream of the DOC; wherein the first sensor signal is indicative of an amount of NOx in the exhaust flow upstream of the DOC;
receiving a second sensor signal from a second NOx sensor positioned in the exhaust flow downstream of the DOC; wherein the second sensor signal is indicative of an amount of NOx in the exhaust flow downstream of the DOC;
receiving a third sensor signal from a temperature sensor positioned in the exhaust gas flow; wherein the third sensor signal is indicative of a temperature of the exhaust flow;
calculating via a controller a difference between the amount of NOx upstream of the DOC and the amount of NOx downstream of the DOC based on a difference between the first sensor signal and the second sensor signal;
determining via the controller whether predetermined operating conditions are satisfied;
determining via the controller a DOC aging level based on a predetermined correlation between the calculated difference and DOC aging only if the predetermined operating conditions are satisfied; wherein said predetermined correlation is further based on the temperature of the exhaust flow;
determining a mass flow rate of NOx flowing past the first NOx sensor based at least partially on the first sensor signal;
determining an amount of time over which a predetermined amount of NOx passes the first NOx sensor at the mass flow rate;
periodically receiving additional sensor signals from the first and the second NOx sensors during the amount of time;

wherein said calculating the difference includes averaging differences between the first and the second sensor signals and the additional sensor signals periodically received during the amount of time;

wherein the predetermined operating conditions include that:
- regeneration of a diesel particulate filter (DPF) positioned in the exhaust flow has occurred within a predetermined time period;
- temperature of the exhaust flow is less than a predetermined temperature;
- an exhaust fluid injector positioned in the exhaust flow upstream of a selective catalyst reduction (SCR) system and downstream of the DOC is inactive; and
- exhaust flow is within a predetermined range of exhaust flow rates.

17. The method of claim 16, further comprising:
estimating an amount of nitrogen dioxide ($NO_2$) in the exhaust flow entering the SCR system based on the determined DOC aging level.

* * * * *